(12) United States Patent
Fuchs et al.

(10) Patent No.: US 11,277,964 B2
(45) Date of Patent: Mar. 22, 2022

(54) VEHICLE FOR DISCHARGING CROP AND CORRESPONDING USE

(71) Applicant: EXEL INDUSTRIES, Epernay (FR)

(72) Inventors: Bernhard Fuchs, Regensburg (DE); Michael Gallmeier, Ergoldsbach (DE)

(73) Assignee: EXEL INDUSTRIES, Epernay (FR)

( * ) Notice: Subject to any disclaimer, the term of this patent is extended or adjusted under 35 U.S.C. 154(b) by 245 days.

(21) Appl. No.: 16/443,092

(22) Filed: Jun. 17, 2019

(65) Prior Publication Data
US 2019/0387669 A1    Dec. 26, 2019

(30) Foreign Application Priority Data

Jun. 22, 2018   (EP) .................................. 18305799

(51) Int. Cl.
| A01D 33/10 | (2006.01) |
| A01D 90/10 | (2006.01) |
| A01D 25/04 | (2006.01) |
| B60P 1/36 | (2006.01) |

(52) U.S. Cl.
CPC ........... *A01D 33/10* (2013.01); *A01D 25/048* (2013.01); *A01D 90/10* (2013.01); *B60P 1/36* (2013.01)

(58) Field of Classification Search
CPC ...... A01B 79/005; A01D 33/00; A01D 33/10; A01D 43/087; A01D 43/073; A01D 25/048; A01D 41/1217; A01D 90/10
USPC ...................................................... 56/16.4 R
See application file for complete search history.

(56) References Cited

U.S. PATENT DOCUMENTS

| 5,387,155 | A | | 2/1995 | Dietz | |
| 5,749,783 | A | * | 5/1998 | Pollklas | A01D 43/073 |
| | | | | | 414/345 |
| 6,070,673 | A | * | 6/2000 | Wendte | A01B 79/005 |
| | | | | | 172/2 |
| 2011/0061762 | A1 | * | 3/2011 | Madsen | B65G 67/32 |
| | | | | | 141/1 |
| 2013/0149092 | A1 | * | 6/2013 | Kalverkamp | A01D 33/00 |
| | | | | | 414/528 |
| 2014/0224377 | A1 | * | 8/2014 | Bonefas | A01D 43/073 |
| | | | | | 141/1 |
| 2016/0113192 | A1 | * | 4/2016 | Dettmer | A01D 33/08 |
| | | | | | 171/83 |
| 2016/0183463 | A1 | | 6/2016 | Herman et al. | |
| 2016/0270294 | A1 | * | 9/2016 | Viaene | A01D 43/073 |
| 2017/0055446 | A1 | * | 3/2017 | Nykamp | A01D 43/073 |

FOREIGN PATENT DOCUMENTS

FR    2533798    4/1984

OTHER PUBLICATIONS

European Search Report for EP18305799; dated Dec. 14, 2018.

* cited by examiner

*Primary Examiner* — Alicia Torres
*Assistant Examiner* — Matthew Ian Neal
(74) *Attorney, Agent, or Firm* — Duane Morris LLP

(57) ABSTRACT

A vehicle to discharge root crop to define a root crop heap, includes a drive device to drive the vehicle, a crop bunker to contain the crop to be discharged, a discharge device to discharge the root crop from the crop bunker. The vehicle further includes a control device to control the discharge device to create the root crop heap with defined heap parameters, where the heap parameters include one or more of: a defined heap location, a defined heap width, and a defined heap orientation, and the heap is the root crop heap on a ground of a field.

17 Claims, 10 Drawing Sheets

VEHICLE FOR DISCHARGING CROP AND CORRESPONDING USE

The present invention relates to a vehicle for discharging crop, in particular root crop, to form a crop heap, the vehicle comprising:
- a drive device adapted to drive the vehicle,
- a crop bunker adapted to contain the crop to be discharged, and
- a discharge device adapted to discharge the crop from the crop bunker.

Vehicles for discharging crop, in particular root crop, to form a crop heap are known in the prior art.

Such a vehicle for discharging is for example a Holmer Terra Dos T4.

The vehicle comprises a crop bunker and a discharge device adapted to discharge the crop from the crop bunker. For creating the crop heap, the operator needs to steer the vehicle manually and needs to activate and deactivate the discharge device manually.

Consequently, the created crop heap depends at least in part on the experience and proficiency of the operator.

It is an object of the invention to further improve vehicles for discharging crop in order to render the crop heap creation more economic. Other objects of the inventions are rendering the further handling of the crop on the crop heap more efficient and more economic.

In order to achieve at least one of the above objects the invention relates to a vehicle as defined above, characterized in that the vehicle comprises a control device adapted to control the discharge device so as to create a crop heap with defined heap parameters, the heap parameters including one, more or all of: a defined heap location, a defined heap width and a defined heap orientation.

According to specific embodiments, the vehicle according to the invention can comprise one or more of the following features, taken alone or together in all technically possible combinations:
- the control device comprises pose detection means adapted to detect the current pose of the vehicle, the pose including a current vehicle location and a current vehicle orientation of the vehicle with respect to the environment, and the control device is adapted to control the discharge device as a function of the detected current pose, in particular as a function of the current vehicle location and/or current vehicle orientation;
- the control device is adapted to control the drive device during discharging of the crop so as to move the vehicle according to the defined heap width and the defined heap orientation;
- the vehicle is adapted to move in crab steering in which a longitudinal axis (LA) of the vehicle is misaligned with respect to a drive direction (DD) of the vehicle, in particular the control device is adapted to drive the vehicle in crab steering during discharging of the crop so that the drive direction is parallel to the defined heap orientation;
- the drive device comprises front wheels and rear wheels and the control device is adapted to control the vehicle so that during discharging the crop along a forward and/or rearward discharging direction, the front wheels are further away from the defined heap location than the rear wheels;
- the control device comprises
  - a heap memory adapted to contain data representing the defined heap parameters, in particular the defined heap location, the defined heap width and/or the defined heap orientation and
  - data input means adapted to allow input of the data representing the defined heap parameters into the heap memory, and
  the control device is adapted to control the discharge device as a function of the data contained in the heap memory for creating the crop heap; and
- the discharge device comprises a discharge conveyor having a discharge entrance and a discharge exit and the control device is adapted to control a discharge height (DH) of the discharge exit during discharging, as a function of the defined heap parameters;
- the discharge conveyor comprises a discharge segment and a chassis segment, and wherein the discharge segment and the chassis segment are adapted to be inclined one with respect to another according to different inclination angles;
- the discharge device comprises a crop heap height sensor adapted to detect a current crop heap height (CCH) and wherein the control device is adapted to control the discharge height as a function of the detected current crop heap height and of the advance of the vehicle;
- the control device comprises a field memory containing information representing the field in which the crop heap is to be created, and in particular field boundary information representing the field boundaries, and wherein the control device comprises pick-up location memory comprising pick-up location information representing a pick-up location to which the crop of the crop heap is to be transferred from the crop heap;
- the field memory contains harvest line information representing at least one reference line of a harvest device during harvesting the crop and wherein the heap memory comprises an offset memory containing offset information of the crop heap to one of the at least one reference line, and wherein the reference line and the offset information define the crop heap orientation (DHO) and the crop heap location (DHL);
- the control device comprises a real heap memory, adapted to comprise real heap information about the real crop heap and representing at least one, several or all of:
  - a real heap location, preferably including a real heap width and a real heap orientation;
  - a real crop heap length;
  - a real heap height;
  and in particular wherein the control device comprises real heap information interface for transferring the heap information from the real heap memory to another control device;
- the vehicle is a crop harvester having a harvesting device for harvesting the crop and the harvesting device is adapted to generate the harvest line information during harvesting of the crop; and
- the vehicle is a transfer loader without a harvesting device for harvesting the crop and wherein the control device is adapted to receive information representing the harvest line information resulting from the harvesting operation of the crop.

The invention relates also to the use of a vehicle as defined above comprising the steps of:
- filling the crop bunker with harvested crop,
- discharging the crop from the crop bunker with the discharge device, and
- controlling the discharge device with the control device so as to create the crop heap with the defined crop heap parameters It is contemplated that the various features set forth in the preceding paragraphs, in the claims and/or in the following description and drawings may be taken independently or in any combination thereof. For example, features disclosed in connection with one embodiment are applicable to all embodiments, except where there is technical incompatibility of features.

Furthermore, the statements contained in the description relate to particular embodiments and are not to be construed as limitations on the scope of the invention or on the definition of terms used in the claims, except where a term or phrase is expressly defined. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

Also, each functional feature, as disclosed for example by "adapted to" or "for", should be understood as disclosing the corresponding method step during use of the device.

The invention will be better understood in light of the following specification, which refers to the annexed figures which show:

FIG. 1 a schematic top view of an environment and a vehicle for discharging crop according to the invention during the beginning of the discharge operation and at the beginning of the crop heap creation;

Figure 6:
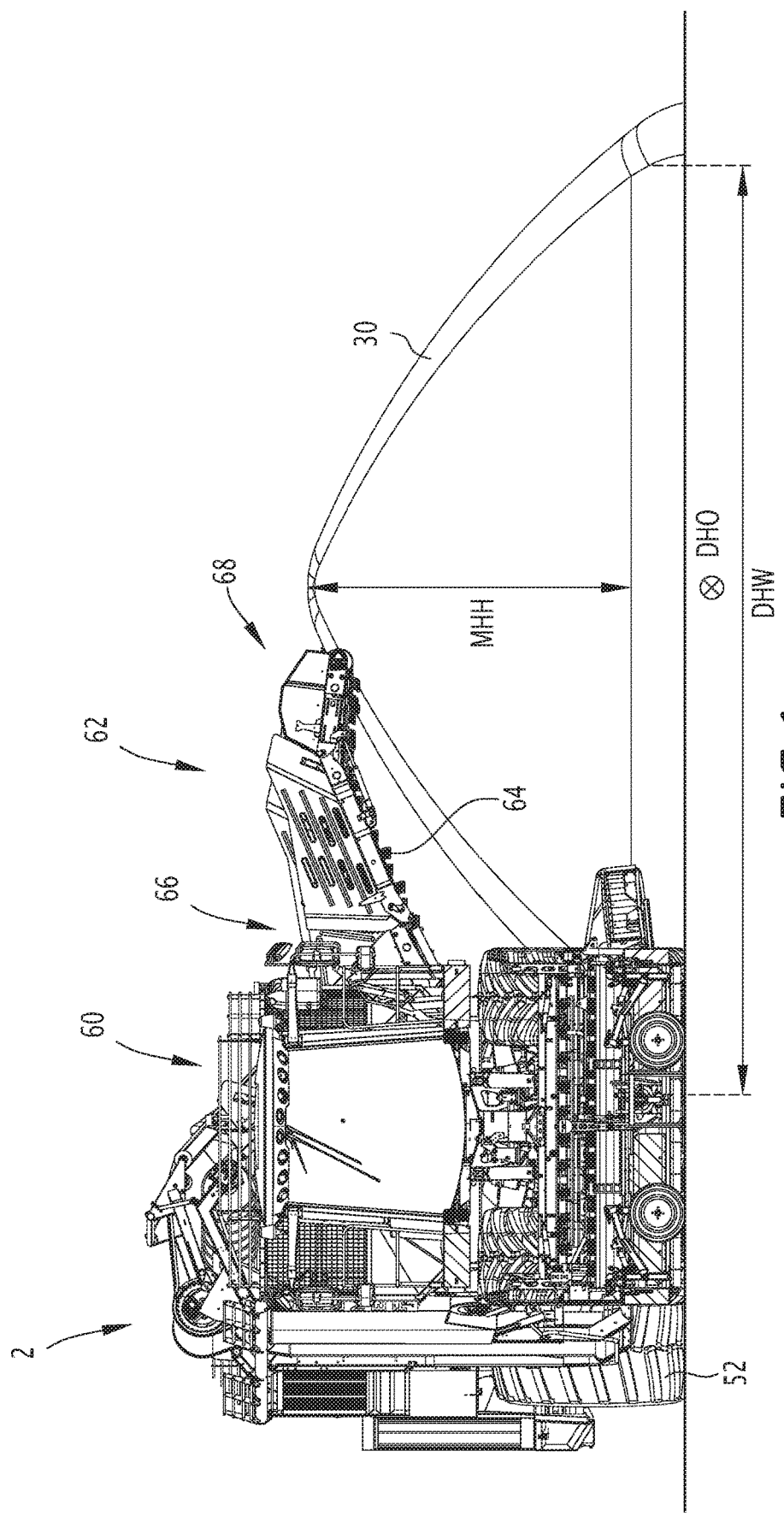
FIG. 6 is a view corresponding to the view of FIG. 2, the crop heap being the crop heap of FIG. 5.
Figure 7:
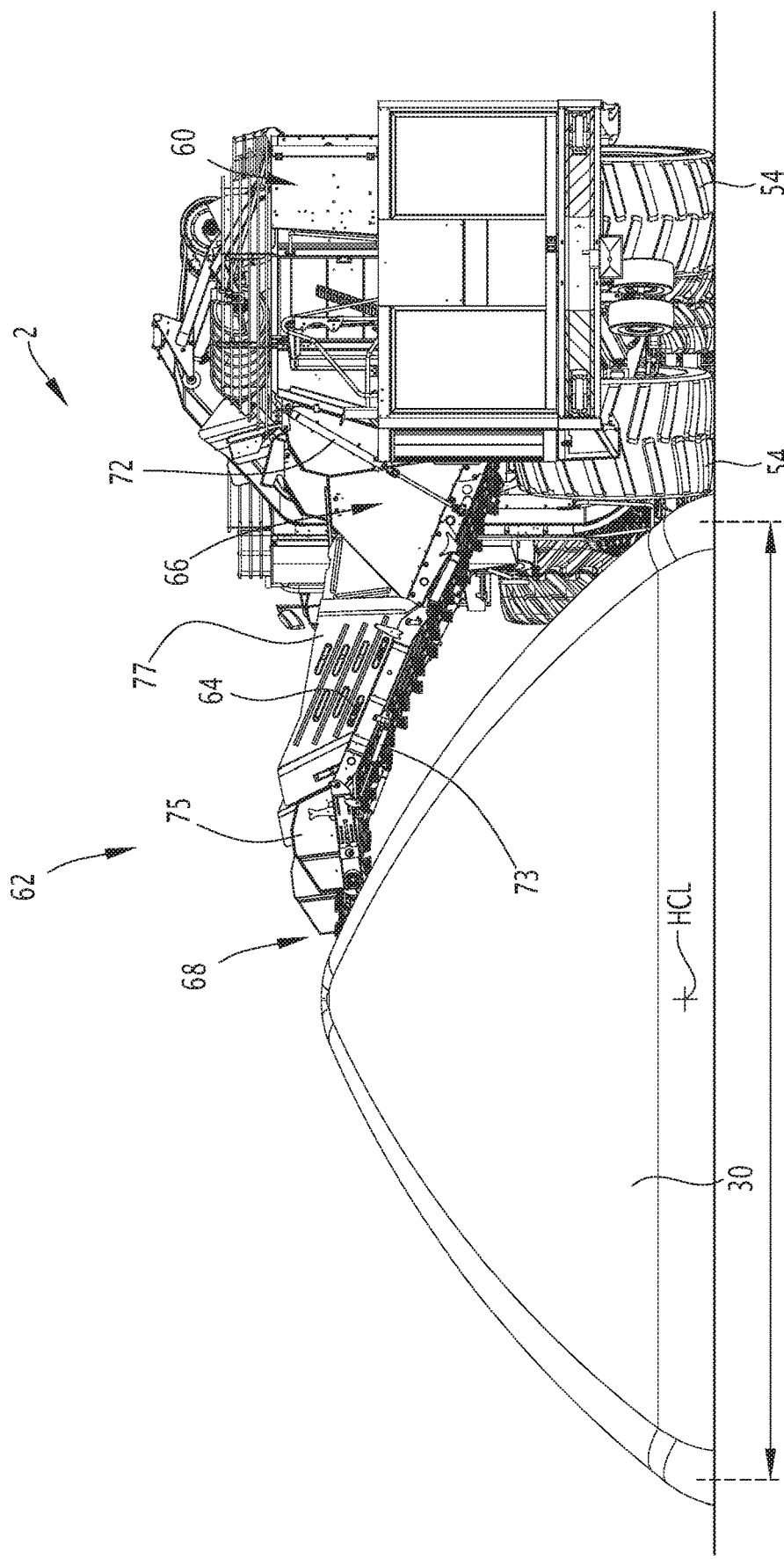
Figure 8:
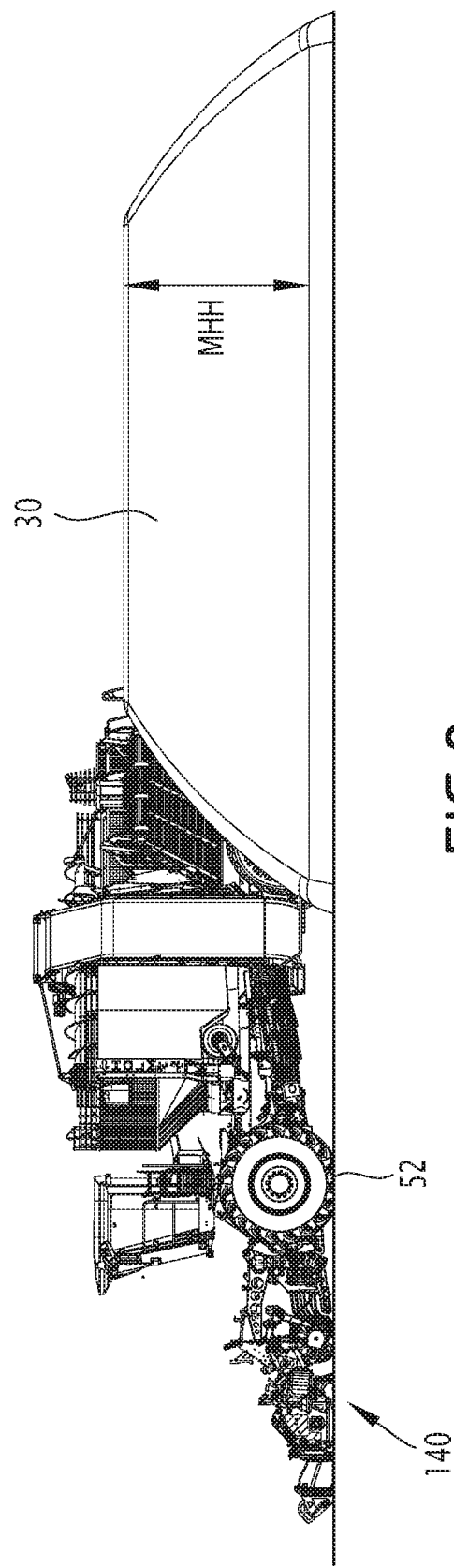
Figure 9:
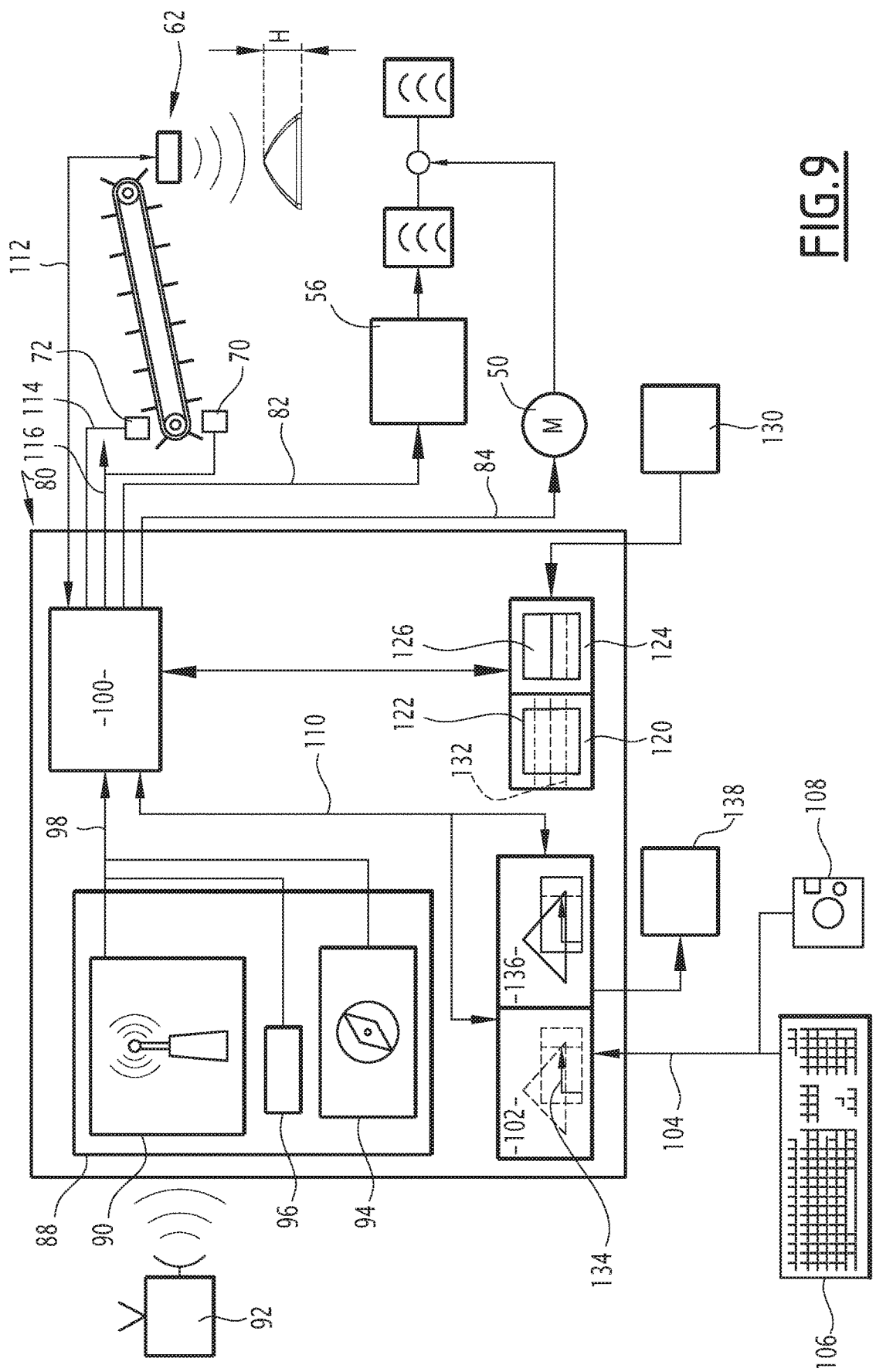
Figure 10:
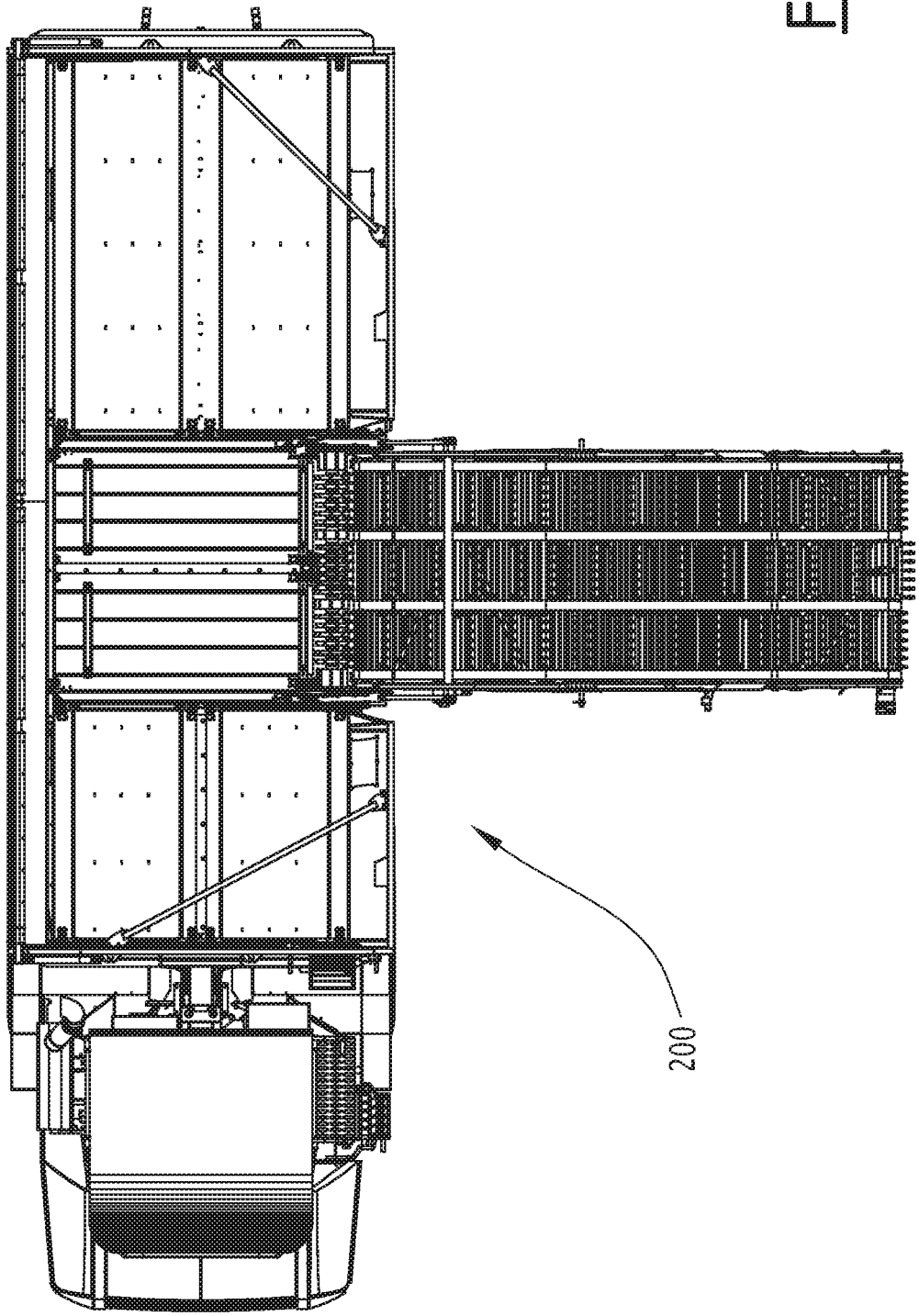

FIGS. 7 and 8 correspond to FIGS. 3 and 4, but the crop heap is the crop heap of FIGS. 5 and 6, namely at a later stage of crop heap creation;

FIG. 9 is a schematic view of a control device of the vehicle according to the invention and depicted on FIGS. 1 to 8 as well as some elements connected to the control device, and FIG. 10 is a schematic top view of another embodiment of the vehicle according to the invention.

Figure 1:
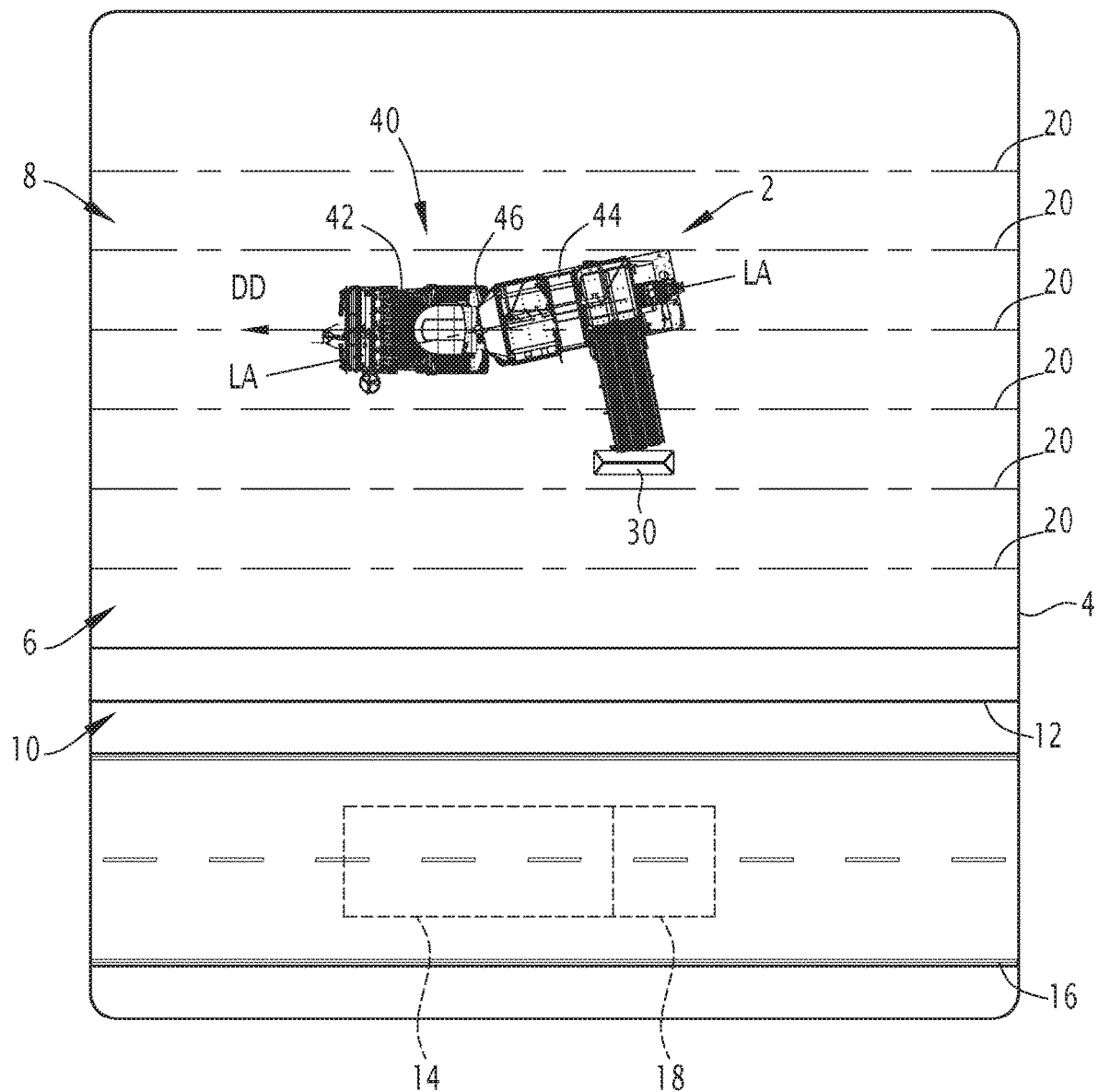

On FIG. 1 is represented a vehicle for discharging crop according to the invention and designated by the general reference 2. The vehicle for discharging crop 2 operates in an environment 4. The environment 4 comprises a head land 6 and a main land 8 defining together an agricultural field 10. Before harvesting, in the agricultural field 10 crop has been grown and is present in the soil. The crop can be harvested by a harvesting device. The crop can be in particular root crop, such as sugar beets, or can be other crop that is to be stored temporarily at a side of the filed in a heap, such as shredded corn plants. In case of root crop during harvesting, the roots are drawn out of the soil eventually separated from leaves.

The environment 4 comprises also in proximity to a field boundary 12, a pick-up location 14 at which a truck or lorry can be placed for picking up crop. The pick-up location 14 is for example defined by a road 16. The truck or lorry can be generally a pick-up device 18 adapted to carry the crop.

During harvesting of the crop, reference lines 20 are created that represent the path along which a harvesting device operates during harvesting the crop. The references lines 20 are in general parallel and are parallel to the field boundary 12 and may be parallel to the road 16.

In order for the pick-up location 14 or pick-up device 18 being able to correctly and economically be charged with the crop, it is necessary to create a crop heap 30. The crop heap 30 needs to be created with defined heap parameters, which include a defined heap location DHL, such as a defined heap end, a defined heap width DHW and a defined heap orientation DHO (see FIG. 5). The defined heap orientation DHO extends for example parallel to either the field boundary 12 or parallel to the road 16, so that the pick-up device 18 can be loaded in a continuous and regular manner with the crop of the crop heap 30. The defined heap width DHW is for example defined by the nominal operating width of a transfer loader (not represented) picking up the crop from the crop-heap 30 and transferring the crop to the pick-up device 18.

From these basic crop heap parameters follow the remaining crop heap parameters, such as the maximum heap height MHH (see FIG. 6), which is defined by the defined heap width DHW and the natural angle of repose of the crop that is added to the crop heap 30. The overall heap length OHL is defined by the quantity of the crop harvested in the field and the defined heap width DHW as well as the maximum heap height MHH.

The crop heap 30 has therefore a heap centre line HCL extending along the defined heap orientation DHO and defined by the distance of the field boundary 12 with respect to the pick-up location 14 and the nominal working distance of the transfer device (not represented).

As can be seen on FIG. 1, the vehicle for discharging crop 2 comprises a chassis 40, which is in the present case a two-part chassis comprising a front part 42 and a rear part 44. The front part 42 and the rear part 44 are linked one to another by a vertical link 46. The vehicle for discharging crop 2 comprises a drive device 48 (see FIG. 3) having for example a motor 50, front wheels 52, rear wheels 54 and a steering device 56.

The depicted embodiment of the vehicle for discharging crop 2 has front wheels 52 and rear wheels 54 that are spaced apart one from another a distance along the axle direction that corresponds to the width of the vehicle. According to a non-illustrated variant, the vehicle for discharging crop 2 has at least one of the front wheels or rear wheels in the form of a single double-wheel that is arranged, taken along a direction perpendicular to the driving direction or the axle direction, in the centre of the vehicle. The vehicle for discharging crop 2 has in this case the general configuration of a three-wheeler.

The steering device 56 allows steering the front wheels 52 and the rear wheels 54 independently from each other and in particular each wheel 52, 54 individually with respect to the chassis 40 or with respect to the corresponding chassis part

42, 44. The motor 50 is adapted to drive some or all of the front wheels 52 and rear wheels 54 simultaneously.

The vehicle for discharging crop 2 has a longitudinal axis LA, which can be the longitudinal axis of the chassis 40 and which is in the present case the longitudinal axis of the rear part 44 of the chassis. As the front wheel 52 and the rear wheels 54 can be steered individually with respect to the chassis 40, the vehicle for discharging crop 2 is adapted to move in what is commonly called "crab steering", in which the longitudinal axis LA of the vehicle 2 is misaligned with respect to a drive direction DD of the vehicle. In the present case, the drive direction DD on FIG. 1 is parallel to the corresponding reference line 20. A longitudinal axis of the front part 42 of the chassis is aligned with or parallel to these reference lines 20, whereas the longitudinal axis LA of the rear part 44 of the chassis extends in a non-parallel manner to the reference line 20 (in view from above).

The vehicle for discharging crop 2 comprises also a crop bunker 60 adapted to contain the crop to be discharged or actually containing the crop to be discharged. The vehicle for discharging crop 2 comprises also a discharge device 62 adapted to discharge the crop from the crop bunker 60 in order to form the crop heap 30. In the present embodiment, the discharge device 62 comprises a discharge conveyor 64 having a discharge entrance 66 and a discharge exit 68 as well as a conveyor drive device 70, for example a conveyor motor (see FIG. 3). The discharge device comprises also discharge control means, which in the present embodiment comprise a main hydraulic cylinder 72 and a bending hydraulic cylinder 73, adapted to modify the height of the discharge exit 68 with respect to the ground. To this end, the discharge conveyor 64 is articulated with respect to the chassis 40. The inclination of the discharge conveyor 64 with respect to the chassis around an articulation joint of the discharge conveyor 64 with respect to the chassis is controlled by extending and retracting the main hydraulic cylinder 72.

The discharge conveyor 64 comprises a discharge segment 75, defining the discharge exit 68, and a chassis segment 77, defining the discharge entrance 66. The discharge segment 75 and the chassis segment 77 are articulated one with respect to another and are adapted to be inclined according to different inclination angles one with respect to another, in the present case by the bending hydraulic cylinder 73. The combined inclination of the discharge segment 75 with respect to the ground, stemming from the current lengths of the main hydraulic cylinder 72 and the bending hydraulic cylinder 73, determines the discharge angle and the discharge velocity of the crop leaving the discharge conveyor 64 at the discharge exit 68. The discharge conveyor 64 is generally a segmented conveyor comprising at least two segments. As a variant, the discharge conveyor 64 can comprise more segments than the discharge segment 75 and the chassis segment 77, for example an intermediate segment arranged between the discharge segment 75 and the chassis segment 77.

The discharge device 62 comprises also a crop heap height sensor 74 adapted to detect a current crop heap height CCH at the location at which currently crop is discharged by the discharge device 62. The crop heap height sensor 74 is for example an ultrasonic sensor or a laser sensor or a camera or a radar.

The vehicle for discharging crop 2 comprises furthermore a control device 80 adapted to control the discharge device 62 so as to create a crop heap with defined heap parameters. The heap parameters include as defined above, one or more of a defined heap location DHL, a defined heap width DHW and a defined heap orientation DHO.

The control device 80 is adapted to control the drive device 48 during discharging of the crop, namely during operation of the discharge device 62, so as to move the vehicle 2 according to the defined heap width DHW and the defined heap orientation DHO. To this end, the control device 80 is connected via a steering line 82 to the steering modules 56 and/or via a drive line 84 to the motor 50. The control device 80 is adapted to drive the vehicle 2 in crab steering during discharging of the crop so that the drive direction is parallel to the defined tip orientation.

More particularly, the control device 80 is adapted to control the vehicle 2, in particular to control the steering module 56 and the motor 50, during discharging of the crop from the crop bunker 60.

The control device 80 is adapted to control the discharging operation according to a fully automatic mode. In this mode, the operator inputs a binary signal of discharging and based on this signal and absent any other concurrent input signal generated by the operator, the control device operates the discharging and moves the vehicle for discharging crop 2 so as to create the crop heap.

Alternatively or in addition, the control device 80 is adapted to control the discharging operation according to a half-automatic mode. In this half automatic mode, the operator inputs a binary signal of discharging and based on this signal and based on a supplementary signal generated by the operator during discharging, the control device 80 operates the discharging and moves the vehicle for discharging crop 2 so as to create the crop heap. The supplementary signal is for example a speed signal in particular stemming from a speed signal generating element, such as the gas pedal. As a function of the supplementary signal, the control device controls the discharging speed of the discharge conveyor 64 and the displacement speed of the vehicle for discharging crop 2.

Alternatively or in addition, the control device 80 is adapted to control the discharging operation according to a height control mode. In this height control mode, the control device 80 discharges the crop with the discharge conveyor 64 up to the maximum heap height MHH at the current location of the vehicle for discharging crop 2 and then stops the discharging operation, waiting for an input by the operator, such as to move the vehicle for discharging crop 2 to the next location for discharging crop.

The discharging operation can be executed either along a forward discharging direction, in which the front part 42 is in front of the rear part 44, seen in the current drive direction, or along a rearward discharging direction in which the rear part 44 is in front of the front part 42, seen in the current drive direction.

Figure 5:
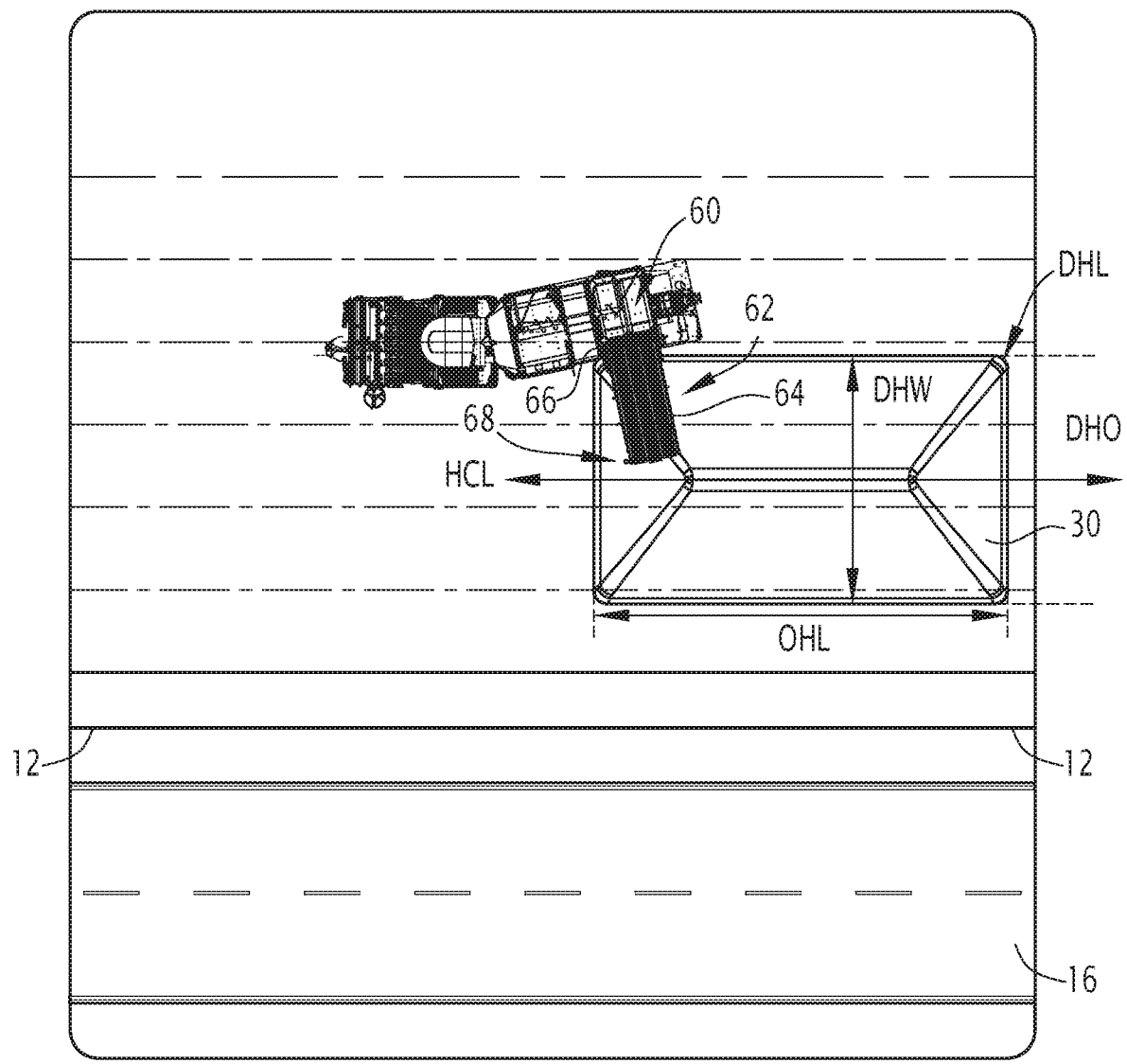
FIG. 5 is a view analogous to the view of FIG. 1, the crop heap being in a later stage of crop heap creation than the one on FIGS. 1 to 4 and having a desired crop heap width and a defined heap orientation.

During discharging in the forward discharging direction, the rear wheels 54 are generally further away from the heap centre line HCL than the front wheels 52 (see FIG. 5). More particularly, during forward discharging, the rear wheel 54 closest to the heap centre line HCL is further away from the heap centre line HCL than the front wheel 52 closest to the heap centre line HCL. During discharging in the rearward discharging direction, the front wheels 52 are generally further away from the heap centre line HCL than the rear wheels 54 in order to avoid the front wheels contacting the crop heap. More particularly, during rearward discharging, the front wheel 52 closest to the heap centre line HCL is further away from the heap centre line HCL than the rear wheel 54 closest to the heap centre line HCL.

The control device 80 comprises furthermore pose detection means 88 adapted to detect the current pose of the vehicle for discharging crop 2. The pose of the vehicle includes a current vehicle location and a current vehicle orientation of the vehicle 2 with respect to the environment 4. The pose comprises also the current configuration of the vehicle of movable elements one to another, in particular of the front part 42 and the rear part 44 one to another or the position of discharge device 62 with respect to the chassis. Generally, the pose comprises the current position of elements of the vehicle that are movable relative to the chassis 40, with respect to the chassis 40.

The control device 80 is furthermore adapted to control the discharge device 62 as a function of the detected current pose by the pose detection means 88 and in particular as a function of the current vehicle location and/or current vehicle orientation. To this end, the pose detection means 88 comprise a current vehicle location detection device 90, for example a GPS receiver, adapted to receive position information from a GPS satellite 92. The pose detection means 88 comprise current vehicle orientation detection means 94, for example a compass or a GPS signal resolver which is adapted to generate an orientation signal from GPS data. The pose detection means 88 comprise also pose sensors 96, which are sensors that are arranged on the vehicle 2 and are adapted to generate information about the current configuration of the vehicle, such as for example the inclination of the wheels 52/54 with respect to the chassis 40 or the inclination angle of the front chassis 42 with respect to the rear chassis 44. These sensor and detection means 90, 94, 96 are linked via corresponding communication lines 98 to a central processing unit (CPU) 100 of the control device 80.

The control device comprises also a crop heap memory 102 adapted to contain data representing the defined crop heap parameters, in particular the defined heap location, the defined heap width and/or the defined heap orientation.

The control device 80 comprises data input means 104 adapted to allow input of the data representing the defined heap parameters into the heap memory 102. The data input means 104 are for example an interface that allows connecting a keyboard 106 or touchpad or data storage device 108 containing the defined heap location data or generating the defined heap location data.

The control device 80 is adapted to control the discharge device 62 as a function of the data contained in the heap memory 102 for or during creating the crop heap 30. To this end, the heap memory 102 is connected via a communication line 110 to the CPU 100.

The control device 80 is furthermore adapted to control the discharge height DH as a function of the detected current crop heap height and/or the advance of the vehicle 2 during discharging or of the current location of the vehicle. To this end, the control device 80, namely the CPU 100, is linked to the heap height sensor 74 via a height sensor line 112. Furthermore, the control device 80 is adapted to control a discharge height DH of the discharge exit 68 during discharging as a function of the defined heap parameters. To this end, the control device 80 is connected to the discharge control means 72 via a discharge height line 114. The control device 80 is also linked via a line 116 to the conveyor drive device 70 and is adapted to drive or stop the device 70.

The control device 80 comprises furthermore a field memory 120 containing information representing the field 10 in which the crop heap 30 is to be created. In particular, the field memory 120 contains field boundary information 122 representing the field boundaries 12. The control device 80 comprises also pick-up location memory 124 comprising pick-up location information 126 representing the pick-up location 14 to which the crop of the crop heap 30 is to be transferred.

The control device 80 comprises to this end a field data interface 130 allowing input of the field boundary information 122 and/or pick-up location information 126.

The field memory 120 may also contain harvest line information 132 representing at least one reference line 20 of a harvest device during harvesting the crop.

The heap memory 102 comprises offset memory 134 containing offset information of the crop heap 30 to one of the at least one reference line 20. The one of the at least one reference line 20 and the offset information define the crop heap orientation and crop heap location.

The control device 80 comprises also a real heap memory 136, adapted to comprise or comprising real heap information about the real crop heap 30 generated by discharging the crop. The real heap information represents at least one, several or all of: a real heap location, preferably including a real heap width and a real heap orientation; a real crop heap length; and a real heap height. In case the real crop heap generated by discharging the crop corresponds to the defined crop heap, the real heap location is identical with the defined heap location DHL, the real heap width is identical to the defined heap width DHW and the real heap orientation is identical to the defined heap orientation DHO. Likewise in this case, the real crop heap length is identical to the overall heap length OHL and the real heap height is identical to the maximum heap height MHH.

The control device 80 comprises furthermore a real heap information interface 138 for transferring the real heap information from the real heap memory 136 to another control device. In this manner, the information relating to the real crop heap can be reused at a later stage, for example during pick-up of the crop of the crop heap.

Figure 4:
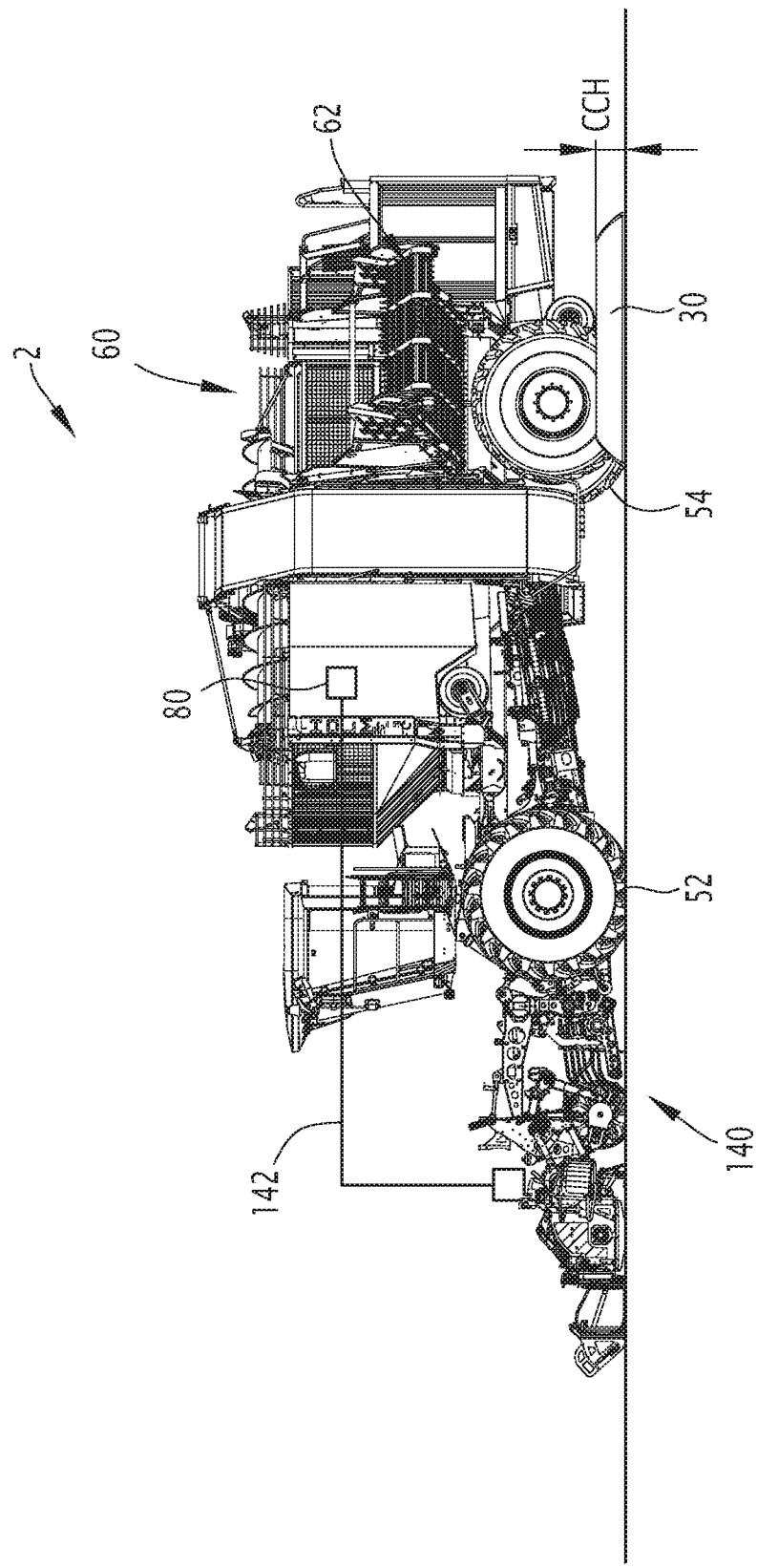
FIG. 4 is a side elevational view of the vehicle for discharging crop and the crop heap of FIGS. 1 to 3.

As seen on FIG. 4, the vehicle 2 is in the present embodiment a crop harvester having a harvesting device 140 adapted to harvest the crop and in particular an uprooting device for uprooting beet crop, such as sugar beets. Furthermore, the harvesting device 140 is adapted to generate the harvest line information 132 and is to this effect connected to the control device 80 via a harvest line generating connection 142.

Alternatively and as represented by FIG. 10, the vehicle for discharging crop 2 can also be a transfer loader 200 which does not have a harvesting device for harvesting the crop. In this case, the control device 80 is adapted to receive the harvest line information 132 generated during the harvesting operation of the crop, for example via the field data interface 130.

The vehicle 2 according to the invention may be operated as follows.

Figure 2:
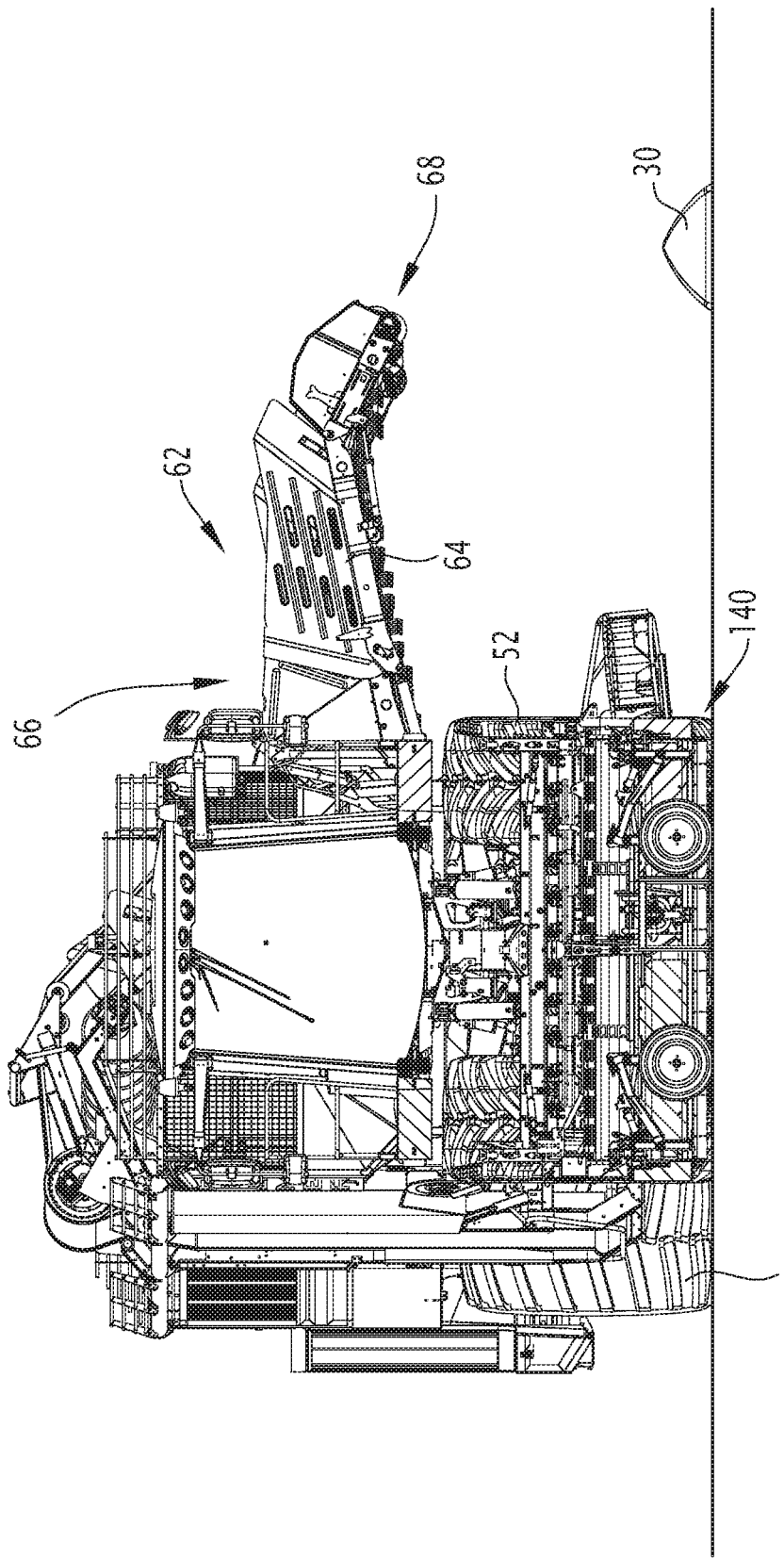
FIG. 2 is a front view of the vehicle for discharging crop of FIG. 1 and the crop heap at the beginning of the crop heap creation.
Figure 3:
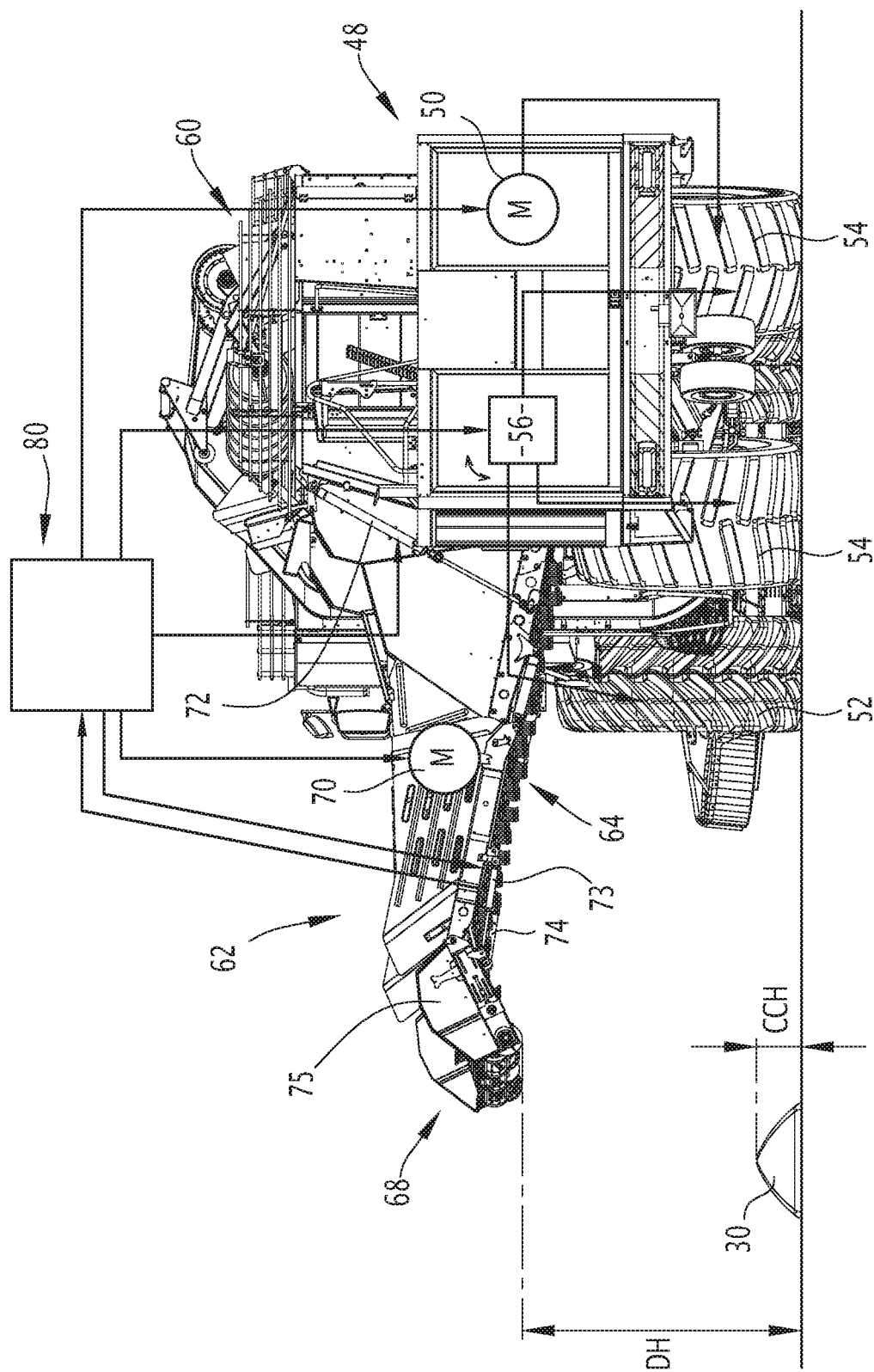
FIG. 3 is a rear view of the vehicle of FIGS. 1 and 2 and the crop heap.

The discharge conveyor 64 has a lower position which is shown on FIGS. 2 to 4 and an upper position which is shown on FIGS. 6 to 8.

Firstly, the crop bunker 60 is filled with crop of which the crop heap 30 is to be generated. During harvesting the crop and in particular during uprooting the root crop in the field, the vehicle 2 generates and memorizes information representing the field boundaries 12 and generates reference lines 20 as well as information regarding the headland 6 and the mainland 8.

Based on this information, a basic reference line 20 is chosen, which is the base line 20 for creating the crop heap 30. Subsequently, the defined heap width DHW is chosen and the defined heap location DHL is also chosen. Based on the defined heap width DHW and the defined heap location DHL an offset is calculated representing the heap centre line HCL and its distance to the basic reference line 20 (AB line).

Then, the driver initializes the automatic discharging operation. The control device 80 then drives the vehicle 2 automatically to the starting point corresponding to the starting location for discharging the crop. The discharge device 62 is brought automatically by the control device to the necessary height taking into account the heap height sensor information 74.

At the end of the discharging operation, the discharge conveyor 64 is brought automatically by the control device 80 in its final position.

In a general manner, the vehicle 2 is used by filling the crop bunker 60 with harvested crop, discharging the crop from the crop bunker 60 with the discharge device and controlling the discharge device with the control device 80 so as to create the crop heap 30 with the defined crop heap parameters.

The vehicle according to the invention allows discharging the crop so as to create with less human operator control a crop heap having determined parameters. The generated crop heap can be economically picked up and transferred to transport vehicles.

The invention claimed is:

1. A vehicle to discharge root crop to define a root crop heap, the vehicle comprising:
    a drive device to drive the vehicle,
    a crop bunker to contain the crop to be discharged,
    a discharge device to discharge the root crop from the crop bunker, wherein
    the vehicle includes a control device to control the discharge device to create the root crop heap with defined heap parameters,
    the defined heap parameters include one or more of: a defined heap location, a defined heap width, and a defined heap orientation,
    the root crop heap is on a ground of a field,
    the control device includes:
        a field memory containing information representing a field in which the root crop heap is to be created,
        the control device includes pick-up location memory including pick-up location information representing a pick-up location to which the root crop of the root crop heap is to be transferred from the root crop heap,
        a heap memory to contain data representing the defined heap parameters, including one or more of the defined heap location, the defined heap width, and the defined heap orientation, and
        a data input device to allow input of the data representing the defined heap parameters into the heap memory,
    the control device controls the discharge device as a function of the data contained in the heap memory for creating the root crop heap,
    the field memory contains harvest line information representing at least one reference line of a harvest device during harvesting the root crop,
    the heap memory includes an offset memory containing offset information of the root crop heap to one of the at least one reference line, and
    the at least one reference line and the offset information define the root crop heap orientation and the root crop heap location.

2. The vehicle according to claim 1, wherein the control device includes a pose detector to detect a current pose of the vehicle, the current pose including a current vehicle location and a current vehicle orientation of the vehicle with respect to an environment, and
    the control device to control the discharge device as a function of the current pose.

3. The vehicle according to claim 2, wherein the control device controls the discharge device as a function of one or more of the current vehicle location and the current vehicle orientation.

4. The vehicle according to claim 1, wherein the control device controls the drive device during discharging of the root crop to move the vehicle according to the defined heap width and the defined heap orientation.

5. The vehicle according to claim 4, wherein the vehicle moves in crab steering in which a longitudinal axis of the vehicle is misaligned with respect to a drive direction of the vehicle.

6. The vehicle according to claim 5, wherein the control device drives the vehicle in crab steering during discharging of the root crop so that the drive direction is parallel to the defined heap orientation.

7. The vehicle according to claim 5, wherein
    the drive device includes front wheels and rear wheels, and
    the control device controls the vehicle so that during discharging the root crop along one or more of a forward and a rearward discharging direction, the front wheels are further away from the defined heap location than the rear wheels.

8. The vehicle according to claim 1, wherein the discharge device includes a discharge conveyor including a discharge entrance and a discharge exit and the control device controls a discharge height of the discharge exit during discharging, as a function of the defined heap parameters.

9. The vehicle according to claim 8, wherein
    the discharge conveyor includes a discharge segment and a chassis segment, and
    the discharge segment and the chassis segment are inclined with respect to one another according to different inclination angles.

10. The vehicle according to claim 8, wherein
    the discharge device includes a crop heap height sensor to detect a current root crop heap height, and
    the control device controls the discharge height as a function of the detected current root crop heap height and advance of the vehicle.

11. The vehicle according to claim 1, wherein the field memory contains field boundary information representing boundaries of the field in which the root crop heap is to be created.

12. The vehicle according to claim 1, wherein the control device includes a real heap memory including real heap information about the real crop heap and representing at least one, several, or all of:
    a real heap location, preferably including a real heap width and a real heap orientation;
    a real crop heap length; and
    a real heap height.

13. The vehicle according to claim 12, wherein the control device includes real heap information interface to transfer the heap information from the real heap memory to another control device.

14. The vehicle according to claim 1, wherein
    the vehicle is a crop harvester including a harvesting device to harvest the crop, and
    the harvesting device generates the harvest line information during harvesting of the root crop.

15. The vehicle according to claim 1, wherein
the vehicle is a transfer loader without a harvesting device to harvest the root crop, and
the control device receives information representing the harvest line information resulting from harvesting the root crop.

16. The vehicle according to claim 1, wherein the vehicle discharges the root crop.

17. A method of using the vehicle according to claim 1, the method comprising:
filling the crop bunker with harvested root crop,
discharging the root crop from the crop bunker with the discharge device, and
controlling the discharge device with the control device to create the root crop heap with the defined heap parameters.

\* \* \* \* \*